UNITED STATES PATENT OFFICE.

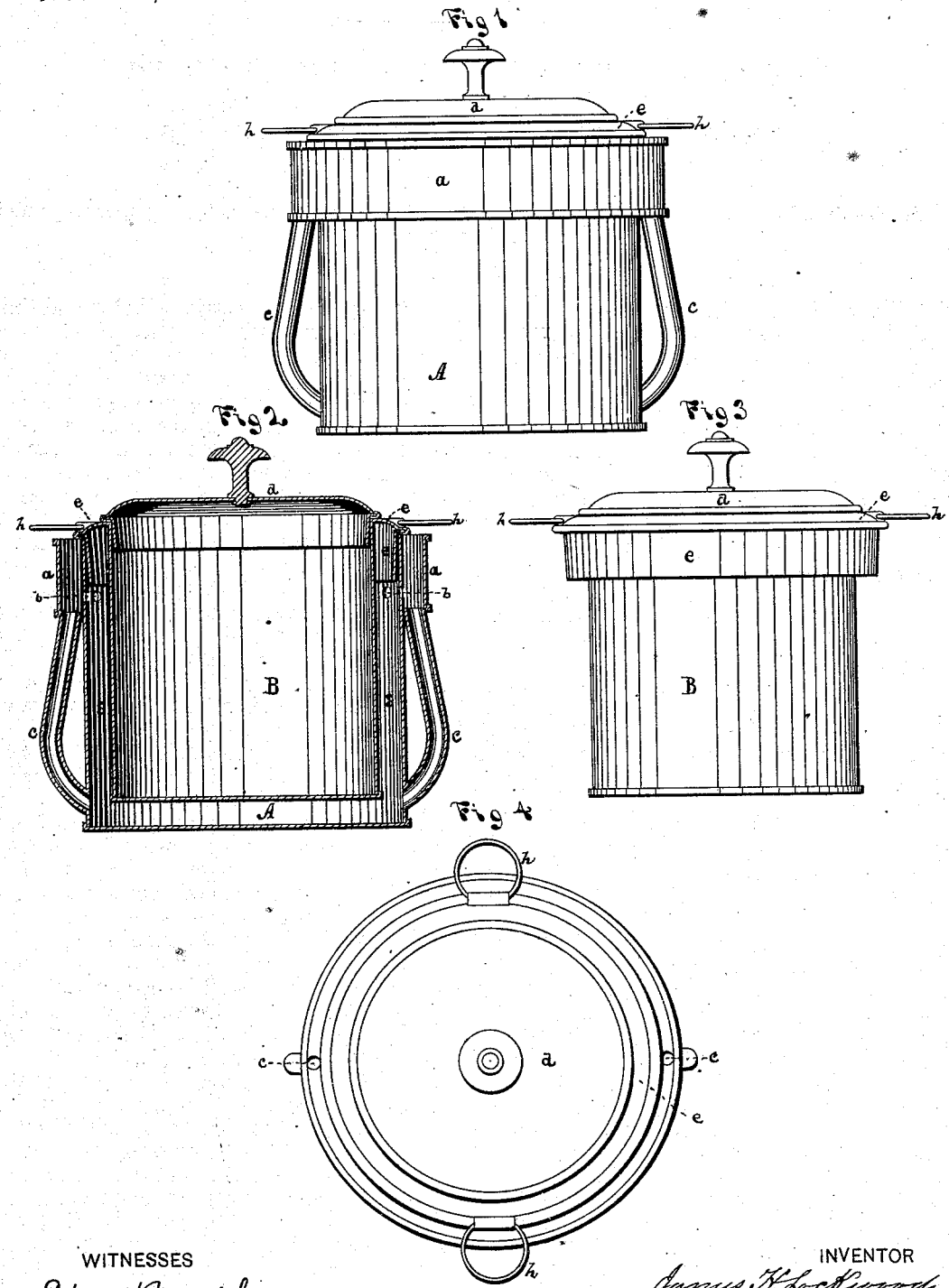

JAMES H. LOCKWOOD, OF CHILLICOTHE, MISSOURI.

IMPROVEMENT IN PORTABLE STEAM-OVENS.

Specification forming part of Letters Patent No. 159,427, dated February 2, 1875; application filed July 13, 1874.

*To all whom it may concern:*

Be it known that I, JAMES H. LOCKWOOD, of Chillicothe, in the county of Livingston and State of Missouri, have invented a new and valuable Improvement in a Portable Steam-Oven; and I do hereby declare that the following is a full, clear, and exact description of the construction and operation of the same, reference being had to the annexed drawings making a part of this specification and to the letters and figures of reference marked thereon.

Figure 1 of the drawings is a representation of a front elevation of my device. Fig. 2 is a sectional view of same. Fig. 3 is a side elevation of the inner vessel. Fig. 4 is a top view of my device.

My invention is a portable steam-oven; and consists in its novel construction and operation for the purpose of boiling or baking puddings, custards, and other similar preparations without liability of burning or scorching the same.

The peculiar features of my device are as follows: An outer and an inner cylindrical vessel with a space between their sides and bottoms, said outer vessel provided with an annular reservoir suitably fastened around said vessel and near its upper edge; a circular series of holes made through the cylinder of the outer vessel near its upper edge, and opening into said reservoir; two or more pipes leading externally from the bottom of said reservoir into said outer vessel near its bottom, said inner vessel having a suitable cover, and the said space between the two vessels covered by an annular flange projecting horizontally outward from the upper edge of the inner vessel, all of which, and their purposes, are hereinafter more fully described and illustrated by the accompanying drawings, in which the same letters designate identical parts of the device in the different figures respectively.

The letter A represents the said outer cylindrical vessel, metallic, and of any suitable size and capacity. Around the outside of said vessel, and near its upper edge, is suitably attached a square-edged annular reservoir, *a*, its bottom projecting horizontally outward from the outside of said cylinder, its top edge even with the upper edge of the same, and with a suitable space open at the top between the outer surface of the said cylinder and the inner surface of said reservoir. Near the bottom, on the inside of the reservoir, and through the said cylinder, are pierced a horizontal series of holes, *b*, for the purpose of opening communication between the inside of the vessel A and the open reservoir *a*. Again, two or more tubes, *c*, are suitably attached outside of said vessel and reservoir to open communication from the bottom of the reservoir into said vessel near its bottom edge. The letter B represents the aforesaid inner vessel, also metallic, and of a size and capacity somewhat less than the outer vessel A, so that when one vessel is placed within the other a space, *s*, is made between their sides and bottoms. It is also provided with a suitable cover, *d*, and with suitable handles *h*, with which to readily place or remove said vessel at will. The upper edge of said vessel B has a flange, *e*, projecting horizontally outward, said flange having its outer edge folded down, as shown by Fig. 3 of the drawings, making an open space between the outside surface of the vessel B and the inside surface of, and below, the said flange *e*. The circumference of the said folded rim of said flange is made so as to fit and slide down tightly within the upper edge of the outer vessel A, and yet not to slide over or cover up the aforesaid holes *b*, nor allow the bottoms of the two vessels to come together, while at the same time it covers over the aforesaid space *s* with a tight joint.

The mode of using my device, the construction of which is described above, and its operation, are as follows: Water is put into the outer vessel A, so that when the vessel B is properly inserted within it the water occupying the aforesaid space *s* between the two vessels shall not rise quite up to the holes *b*. The vessel B, having been suitably filled with either of the aforesaid preparations to be cooked, is covered and placed within the vessel A, as described. The whole device is then heated by being placed over a fire, or within any other oven. When the heat is imparted to the water contained within the said space *s*, so as to make it boil, the steam thus generated properly cooks the preparation within the vessel B without the least liability to scorch or burn the same, so long as the said space is kept properly full of water. Any surplus steam or vapor passes through the holes $b$ into the reservoir $a$, where meeting with cooler air it condenses, and passes back again into the vessel A through the tubes $c$.

Thus an even and constant heat is preserved for cooking, as aforesaid, and the vessel A does not require to be so often filled, the water not being so quickly boiled away, and being, to some extent, resupplied by said condensation; besides, said vessel A, or the space $s$, can be easily refilled without removing the vessel B by pouring in water through the reservoir $a$ and down the tubes $c$; therefore

What I claim as my invention, and desire to secure by Letters Patent, is—

In a portable steam-oven, the vessel A, provided with the reservoir $a$, the circles of holes $b$, and the return-tubes $c$, in combination with the vessel B, substantially as and for the purposes specified.

In testimony that I claim the above I have hereunto subscribed my names in the presence of two witnesses.

JAMES H. LOCKWOOD.

Witnesses:
 WILLIAM T. VORIS,
 D. B. DORSEY.